US006376041B1

(12) United States Patent
Morrison et al.

(10) Patent No.: US 6,376,041 B1
(45) Date of Patent: Apr. 23, 2002

(54) EMBOSSED FABRIC

(75) Inventors: David Morrison, West Warwick; James McCulloch, Providence, both of RI (US)

(73) Assignee: Microfibres, Inc., Pawtucket, RI (US)

( * ) Notice: Subject to any disclaimer, the term of this patent is extended or adjusted under 35 U.S.C. 154(b) by 0 days.

(21) Appl. No.: 09/023,317

(22) Filed: Feb. 13, 1998

Related U.S. Application Data

(62) Division of application No. 08/740,429, filed on Oct. 29, 1996, now Pat. No. 5,771,796.

(51) Int. Cl.[7] ........................ B32B 3/02
(52) U.S. Cl. ........................ 428/89; 428/88; 428/90
(58) Field of Search ........................ 428/90, 89, 88

(56) References Cited

U.S. PATENT DOCUMENTS 2,723,937 A 11/1955 Rice
2,756,669 A 7/1956 Hoffman
4,294,577 A * 10/1981 Bernard ........................ 8/488

FOREIGN PATENT DOCUMENTS

GB 1122026 7/1968

* cited by examiner

*Primary Examiner*—Cheryl A. Juska
(74) *Attorney, Agent, or Firm*—Wolf, Greenfield & Sacks, P.C.

(57) ABSTRACT

An embossed pile fabric having a foreground and background with the foreground having a depth in the order of 1.5/2.0 to 100 times that of the background. The foreground can be formed by an engraving roll having portions that are either mill engraved or acid etched, and the background is formed by the engraving roll having portions formed with a router engraved technique.

16 Claims, 2 Drawing Sheets

EMBOSSED FABRIC

This application is a divisional of application Ser. No. 08/740,429, filed Oct. 29, 1996, entitled, EMBOSSING CYLINDER FOR EMBOSSING PILE FABRIC, issued as U.S. Pat. No. 5,771,796 on Jun. 30, 1998.

FIELD OF THE INVENTION

The present invention relates to an embossed fabric and a method for making it.

BACKGROUND OF THE INVENTION

Pile fabrics formed by flocking or other methods are frequently embossed to form a wide range of surface patterns and textures. Ordinarily embossing a pile fabric is achieved by running the fabric through a single cylinder bearing an engraved pattern and subjecting the pile surface to selective amounts of heat, pressure and time embossed with the various parameters determined in part by the type of pile fabric treated. Of particular importance is the engraving cylinder upon which the pattern being embossed is formed. There are basically three types of engraving techniques used to form patterns on these engraving cylinders. They are (a) film photo engraving, which uses an acid etch; (b) mill and dye tooling engraving; and (c) router engraving; which includes both mechanical and hand tooled applications. The choice of each results in an engraved cylinder having different characteristics from the others.

In the film photo engraving, which is predominantly used for fabricating wall coverings and foil wraps using vinyl or vinyl coated papers, a cylinder is made having the capability of very shallow embossing at low heat and pressure. A cylinder capable of shallow embossing, known in the trade as kiss embossing, is ordinarily achieved by acid etching a pattern on a steel or copper cylinder. The pattern is engraved by selectively wrapping the embossing steel or copper cylinder with a special film and thereafter exposing the wrapped cylinder to an acid bath which etches the steel or copper only in areas where the metal is exposed to duplicate the desired pattern. Although steel or copper cylinders are ordinarily used for film photo acid etch engraving, brass will, on occasion, be used to make small cylinders or rolls for specialized applications. Ordinarily the use of brass cylinders or rolls is avoided because the cost is prohibitive. The range of the engraved depth obtained on a steel base cylinder or roll varies from about 0.003 to 0.035 of an inch, while a copper base cylinder or roll has a slightly deeper range of engraving depth possibility of up to 0.050 of an inch. To some extent the engraving depth that is achieved is dependent upon the characteristics of the particular design to be engraved. In general the use of this film photo etch engraving technique to form cylinders or roll for embossing pile fabric is rarely selected because the depth of engraving is too shallow for a permanent embossed design.

A second type of engraving involves a mill and dye tooling engraving technique. Ordinarily mill engraving is effected primarily on steel cylinders although it may also be used on copper or brass cylinders. Steel is preferred because copper does not stand up well to the high heat and pressures ordinarily used during the embossing process for upholstery fabric while brass is cost prohibitive for this type of application.

In the mill and dye tooling engraving process, a hand crafted cutting tool is used for the actual pattern to be engraved. The depth of the engraving in the cylinder is dependent upon the configuration of the pattern. The actual object size, line thickness and spacing of the pattern to be engraved determines or limits the engravers ability to achieve depth. Ordinarily, the depth achieved ranges from 0.002 to 0.060 of an inch. One limitation in utilizing mill engraved cylinders for embossing is the engraving depth while another is pattern repeat size. In a furniture upholstery fabric application this is quite relevant since the repeat size relates to the usefulness of a particular design used for furniture upholstery. A 54 inch repeat would be considered a full repeating pattern. A 27 inch repeat would be considered a half repeating pattern. In this type of engraving, with few exceptions, the largest pattern typically engaged is much smaller and usually is an all-over texture. In many cases the technique is used for all-over textures which do not have pattern repeats and thus can be applied to furniture fabric in any manner or direction required. For example, a background striation type of pattern is possible.

A third type of engraving technique, routing engraving, is used to engrave patterns with larger repeat sizes or patterns that require greater depths of engraving. A full repeat of 54 inches may be engraved and depending on the pattern configuration, engraving in the order from 0.060 of an inch to 0.200 of an inch on a cylinder is achievable. In this routing engraving process, the embossing cylinder is ordinarily a brass based cylinder rather than steel based cylinders. Steel based cylinders can be used, but the hand tooled routing technique is very time consuming and costly. Depending on the particular design and the desired end result the additional cost of hand tooled router engraving may be justified. Steel base cylinders are not ordinarily used for mechanical routing applications because the steel is too hard and brittle and has a tendency to break or crack when deep engraving is required. In the mechanical routing process a film is wrapped about the brass embossing cylinder or roll bearing the exact pattern to be engraved. The cylinder or roll is cut with an overhead milling machine that is ordinarily manually operated to engrave the pattern outlined on the film. Because the engraving on the cylinder is achieved manually on brass, a much deeper cut in the cylinder is achievable. Hand tooled router engraving typically involves the use of either a steel or brass cylinder or roll. Again the film is wrapped around the cylinder or roll to be engraved, but in this case the technician uses strictly hand tools to cut out and engrave the design. Routing engraving is typically used to engrave patterns with large repeat size and great depth of engraving a full repeat of 54 inches can typically be engraved into a cylinder or roll, depending upon the pattern configuration with a depth of anywhere from about 0.060 of an inch to 0.200 of an inch. The advantage of the routing technique is that due to the depth of engraving that can be achieved, the unembossed areas in the pile surface are never exposed to the high heats and pressure associated with the embossing process. Thus, the free ends of the pile under the deep embossed area of the cylinder do not touch the cylinder surface. The end result is that the finished fabrics exhibit a far superior overall improvement in "hand" than when other types of engraving are used.

Heretofore, embossing cylinders have been used that were engraved by acid etching, mill engraving or router engraving to form patterns on flocked or pile fabric. It has, also, been not uncommon in the industry to combine on one embossing cylinder or roll a design formed in part by acid etching and in part by mill engraving. Insofar as is known this technique has not been used to emboss pile type fabrics. Also, insofar as is known, embossing cylinders have not been heretofore made by combining either mill or acid etch in combination with routing engraving (hand or mechanical) engraving techniques in a single cylinder to emboss pile fabrics.

In the manufacture of upholstered, embossed fabric one common problem that has plagued the industry relates to the shiny, glossy, flat areas that are created when a pile surface is embossed. These shiny, glossy, flat surface areas make the fabric look cheap and reduce the overall value of the material. It has been customary to try to avoid these shiny, glossy, flat areas by further processing the embossed goods through a wet or dry processing, or, alternatively use designs that exhibit fine areas only of embossing. The washing processes, however, are relatively costly and often make the fabric of limited commercial value because of costs involved. On the other hand, utilizing patterns with limited embossing areas for small embossed patterns limit the scope of marketable product. These problems have developed primarily when using router engraved cylinders alone.

The problems of fabrics with these glossy flat areas is particularly acute in flocked fabrics using synthetic fibers because the high heat and pressure used during the embossing process plasticize the synthetic fibers, resulting in a shiny area. Additionally, when embossing woven, knitted or tufted pile fabrics the fabric can initially be formed with an irregular pile surface area or texture, which when embossed reduces the undesirable shiny effect.

It is therefore an object of the present invention to provide an improved pile fabric which can be made with a wide range of patterns of large repeat size and without costly processing after the fabric has been embossed. A further object of the present invention is to provide an improved embossed pile fabric that is relatively simple to manufacture and which is less likely to encounter rejection in the manufacturing process. It is, also, an object of this invention to obtain a very soft hand with a texture in the background that eliminates the unfavorable shiny areas in the embossed pattern.

SUMMARY OF THE INVENTION

In the present invention a pile fabric is embossed using an overall non-repeating or repeating texture design engraved on an engraved steel or brass cylinder or roll using a mill and dye tooling or, for very shallow embossing, an acid etch technique to create a background for an embossed design, and a foreground or pattern, in turn, formed by a router engraving technique.

The process utilized uniquely combines two or more separate and distinct designs having different levels of engraving depths to achieve a texture and finish that is uncommon in flocked velvets or other pile fabrics and particularly flocked fabrics. In the present invention, the finer detail of elements achievable by use of mill tool or, in some cases, acid etch engraving on a cylinder or roll is combined with the deeper engraving advantages of a router engraving technique on the same cylinder or roll to produce a bold well-defined or clean cut pattern with a soft overall hand.

It is thus an object of this invention to provide a method of making a pile upholstered fabric having a wide variety of pattern applications with the patterns well defined and the fabric having a soft overall hand.

A further object of this invention is to provide an improved means and method of forming a pile fabric embossed using an embossing cylinder or roll having a background pattern defined by mill engraving or acid etch engraving techniques and a foreground pattern formed by a routing engraving technique, either mechanical or hand tooled or a combination of both.

Another object of this invention is to provide an embossing cylinder or roll having a surface defined in part by mill tool engraving or acid etch technique and in part by routing engraving technique either mechanical or hand tooled or a combination of both.

Another object of this invention is to create a pile fabric with a very soft hand which has a textured background and which eliminates the unfavorable shiny areas in the embossed pattern.

A still further object of the present invention is to provide an improved method of embossing a flocked fabric using an engraving cylinder having a background formed by an acid or mill engraving technique and a foreground pattern formed by a routing engraving.

One more object of the present invention is to provide a method of forming an embossed surface on a pile fabric in which a background pattern is embossed with an embossing roll defined by an acid or mill engraved area and foreground area is defined by a routing engraved area having a depth greater than the depth of the pile fibers.

A still further object of the present invention is to provide an engraving cylinder made of steel or brass and having at least one area engraved by an acid or mill routing technique to form a background pattern and a second area engraved by a routing technique to form a foreground pattern.

Another object of the present invention is to produce a soft embossed pile fabric utilizing a flocked fabric consisting of synthetic pile fiber which has been embossed with a multilayer cylinder produced with a mill and dye of acid etch technique combined with a router technique.

In the present invention in a preferred form, there is provided an embossed flocked fabric which preferably may have a total weight in the order of 6.5 to 9.0 ozs., per square yard, and a pile weight in the order of 1.0 to 3.5 ozs., per square yard with the fabrics preferably having a denier in the order of 0.6 to 3.5 DPF (denier per filament) and with the flocked fabrics embossed in a pattern having a background and foreground with the background formed with a mill tool or acid etch engraved pattern on the cylinder or roll and the foreground formed with a routing engraved pattern on the same cylinder or roll.

BRIEF DESCRIPTION OF THE DRAWINGS

These and other objects and advantages of the present invention will be more clearly understood when considered in conjunction with the accompanying drawings in which.

DETAILED DESCRIPTION OF PREFERRED EMBODIMENTS

Figure 1:
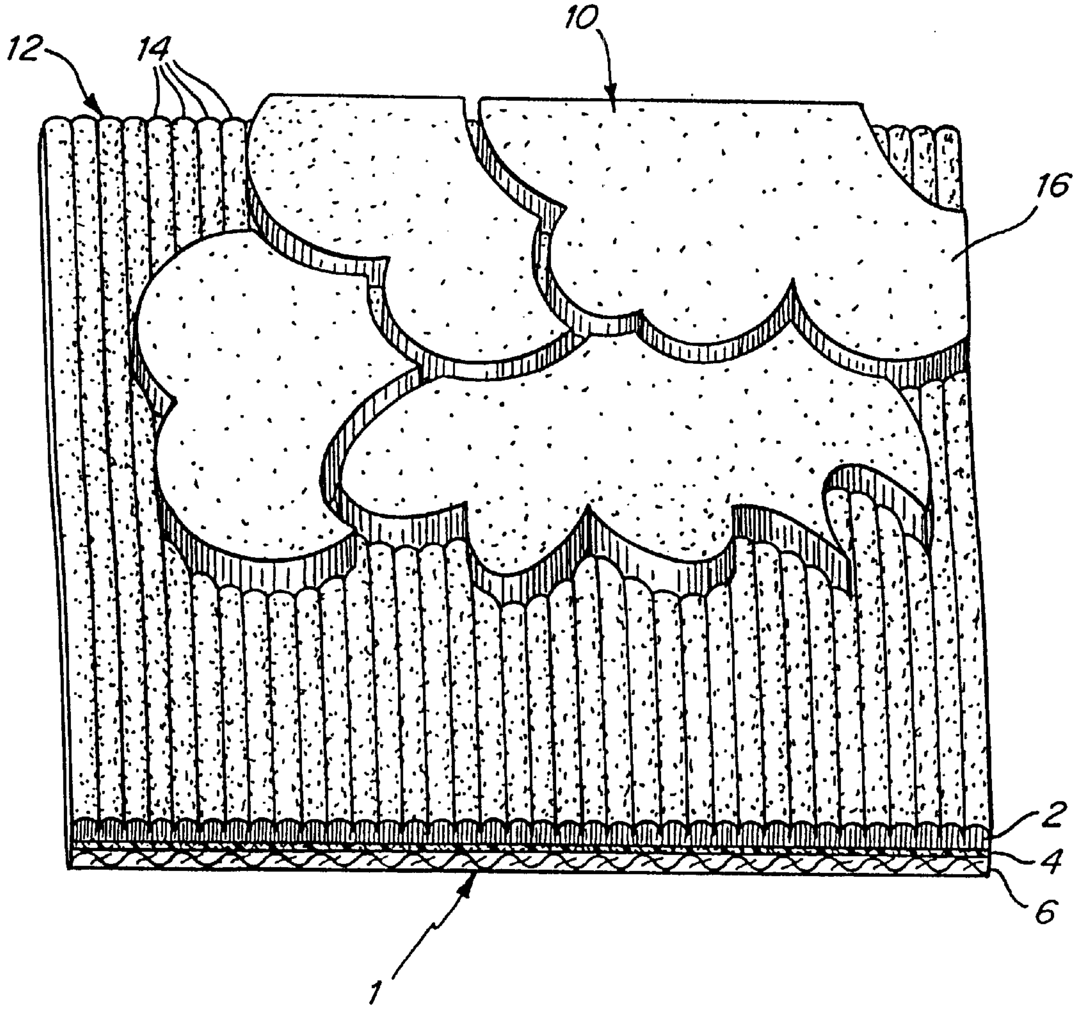
FIG. 1 is a schematic perspective view of a flocked fabric embodying the present invention.

FIG. 1 illustrates a typical flocked fabric made in accordance with and embodying features of the present invention. The flocked fabric 1 may be made by conventional means for forming flocked fabrics. Such flocked fabric may typically consist of a nylon pile face 2 with an adhesive layer 4 and substrate or backer layer 6. The pile face 2 may, for example, consist of 100% nylon fibers having a pile weight typically in the range of 1.0 to 3.5 ozs., per square yard and a fiber denier range of from about 0.6 to 3.5 DPF. The adhesive layer 4, which may be a convention acrylic polymer adhesive, typically may be applied in uniform thickness with 2.0 to 3.0 ozs., per square yard while the substrate may comprise a poly-cotton blend of 65%/35% having a weight in the order of 3.0 to 3.5 ozs., per square yard. The various parameters of the fabric components may be varied by varying the flock weight, the adhesive weight or the substrate weight and by varying the cut length of the flock fibers or their denier. By varying these combinations, a wide and rich range of products may be produced to satisfy various customers or marketing requirements. Depending on the nature of the product desired, and the thickness of the product which typically will range between 0.025 to 0.080 of an inch, the embossing pressure, heat and line speed of the embossing process hereinafter described will be determined.

As illustrated in FIG. 1, the fabric made in accordance with this invention consists of a pattern 10 on a textured background 12. The pattern 10 may, of course, be varied with innumerable patterns possible. In the illustrated embodiment, the pattern is a floral type pattern. The textured background pattern 12 is characterized by groups of pile fibers arranged in a visually discernable pattern, each group including pile fibers extending from the substrate to a distance differing from that of pile fibers located adjacent to the group (see also FIG. 3). The textured background 12 is preferably a non-repeat pattern, which in the illustration is essentially a striation style consisting of a series of parallel ridges 14 extending the length of the fabric. Other styles of overall background treatment are possible including, for example, striations or ridges extending crosswise of the fabric run and simulated weave effects.

In the preferred embodiment, the parallel ridges 14 may typically have a depth in the range of 0.002 to 0.060 of an inch. The actual object size, line thickness and spacing of the pattern to be engraved determines the engraver's ability to achieve depth on the engraving roll and consequently controls the normal depth of the ridges 14.

The pattern 10, in this case a floral pattern, will typically be formed of pile segments 16 shaped to simulate leaves or petals having depths in the range of 0.060 of an inch to 0.20 of an inch. Thus, The pattern 10 has a depth in the order of 1.5 or 2 to 100 times the depth of the textured background 12.

The embossing process starts with an unembossed pile fabric comprising a flocked fabric adhered to a substrate by an adhesive using materials and parameters as described above. The embossing of the fabric may be achieved using conventional embossing equipment in which fabric is embossed using a specially designed cylinder having a background pattern formed preferably by mill and dye tooling engraving techniques and a foreground pattern formed by a routing engraving cylinder in place of the rolls heretofore used.

The engraving roll 50 used, for example, to create a floral pattern with a striation background is made of brass or steel. Typically, the brass or steel cylinder has an outer circumference of 27.5", plus or minus 0.25", or a diameter of approximately 8.678". The diameter can change depending on the type of embossing equipment used and the requirements of the design. The overall width of the cylinder may vary but, typically, may be 60" to 80", with an engraved pattern width of 60" to 80". The engraved cylinder 50 is initially treated by engraving a background using mill and dye tooling engraving techniques or acid etch techniques. Typically, the background 12 is defined by engraving the mirror images of the ridges 14 over the entire surface and circumference of the roll 50. After the background has been engraved on the roll 50, the pattern 10 is then engraved on the same roll using routing engraving techniques. The depth of engraving in the mill and dye tooling or acid etch process to form the background will typically range from about 0.002" to 0.060". On the other hand, the engraving of the foreground pattern will involve engraving depths in the cylinder of in the order of 0.060" to 0.200", with this routing engraving forming the floral pattern illustrated in FIG. 1.

Figure 2:
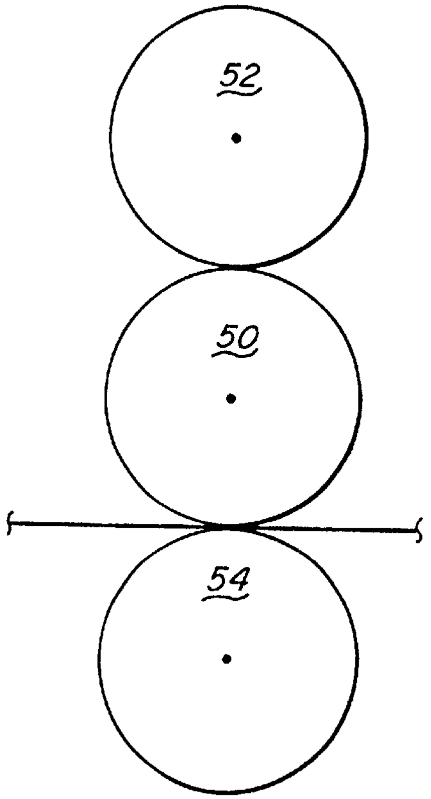
FIG. 2 is a schematic of equipment utilized in practicing the process of the present invention.

As illustrated in FIG. 2, the equipment preferably used in the present invention is a three-roll embossing system. Such systems are made, for example, by Ramisch Kleinwefer of Kriefeld, Germany. Other systems may be used.

Since embossing is a function of dwell time, heat and pressure, the material being embossed determines the amount of dwell time, heat and pressure that has to be used to achieve the desired results. The approximate roll pressure typically used ranges between 300 and 450 PLI, with a surface roll temperature preferably of 375° F. to 500° F., and with a line speed of between 5 to 20 yards/minute. The exact combination of pressure, heat and speed used depends on the material intended to be embossed including the thickness of the material as well as the particular kind of material used.

Various types of embossing equipment is available for use with the present invention. Selection of the particular equipment depends upon the material to be embossed, the depth of the engraved cylinders or rolls used, and the speed at which the fabric is to be processed. Commercial equipment may comprise an embosser which is either a two-roll or three-roll configuration. In a two-roll configuration, the equipment will include an engraved cylinder or roll and a base roll. The base roll ordinarily consists of either a steel or paper/wood-type roll. In more sophisticated, newer equipment, a plastic base roll is used. In a two-roll configuration, the pressure that may be generated is limited since the engraved cylinder or roll will deflect or bend and create uneven embossing if too much pressure is applied.

In the three-roll embossing machine, illustrated in FIG. 2, an engraved cylinder or roll 50 bearing a design formed by the mill and dye tooling engraving process and the routing process is positioned between two paper/wood filled base rolls respectively 52 and 54. In this three-roll system, the pressure that can be generated is far greater than possible in a two-roll system because the top and bottom rolls 52, 54 stabilize the engraved cylinder 50 and minimize deflection problems. In some more recently developed equipment, a special compensating base roll is now available to virtually eliminate deflection. It is this system that is preferred in practicing the present invention.

In the preferred embodiment, the engraved cylinder or roll is typically a cylinder made of brass or steel with an outside circumference of 27.5 inches±0.25 of an inch for a diameter of approximately 83.678 inches. In Europe, it is also common to find a circumference of 25", which would also be suitable for this invention. The interior diameter of the sleeve will vary in accordance with the type of embossing equipment used. The overall width of the sleeve and the width of the engraved pattern, as well as the overall circumference of the engraved cylinder or roll may vary in accordance with the desired end use and the type of embossing equipment that is used.

Figure 3:
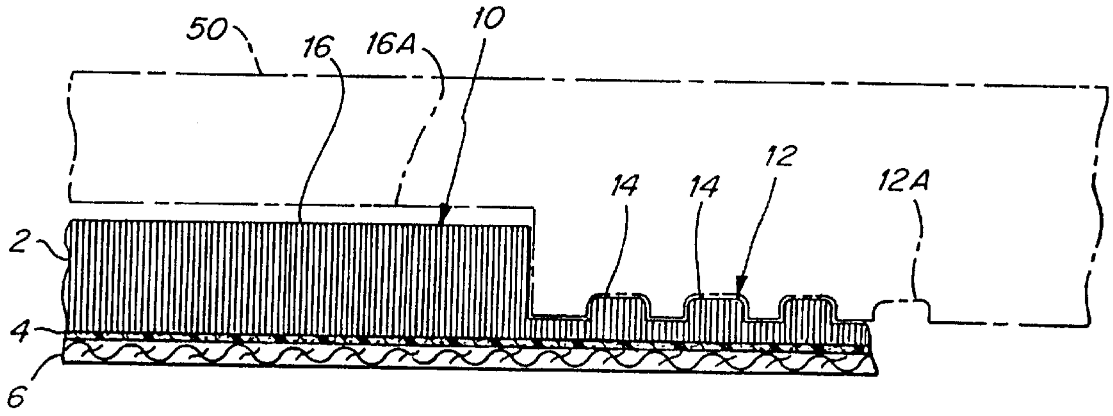
FIG. 3 is a schematic cross sectional illustration of a flocked fabric in relation to an engraving roll as it is fabricated.

The relation of the roll to cylinder to the flocked fabric during the embossing process is illustrated in FIG. 3. In this relation the embossing cylinder 50 has an engraved portion 12A for forming the textured background 12 and an engraved portion 16A for forming the pile segments 16. In the embossing process the portions 12A engage and compress under heat and pressure surface areas of the pile to form the background pattern 12. Simultaneously the foreground pattern or pile segments 16 are spaced from and are not engaged by the engraved portion 16A. This leaves the surface of the foreground pattern untouched. Preferably the space between the upper surface of the pile segments 16 are spaced from the surface of the engraved portion 16A sufficient to avoid plasticizing or adversely affecting the surface. Preferably this may be achieved by making the depth of the foreground 16 engraved portion 16A at least 20% deeper than the height of the pile.

Although the present invention is described in connection with the embossing of the nylon flock fabric, other types of fabrics may also be embossed including woven, knitted, chenille and tufted fabric using features of the present invention. Additionally and for example, propylene, acrylic, polyester and rayon fabrics may be similarly processed. However, in using each of these other materials, heat and pressure, as well as the speed with which the embossing takes place, will necessarily have to be adjusted to compensate for the particular physical characteristics of the material.

What is claimed is:

1. An embossed flocked fabric having a substrate and pile extending therefrom with the pile having a foreground pattern and textured background pattern wherein the textured background pattern is characterized by groups of pile fibers arranged in a visually discernable pattern, each group including pile fibers extending from the substrate to a distance differing from that of pile fibers located adjacent to the group, and is formed by a mill engraved pattern and the foreground pattern is formed by a routing engraved pattern on a common embossing cylinder or roll.

2. A fabric as set forth in claim 1 wherein said foreground and textured background patterns are formed in a nylon pile that is flocked to said substrate.

3. A fabric as set forth in claim 1 wherein said foreground pattern has a pile depth in the order of 1.5 to 100 times that of the textured background pattern.

4. An embossed flocked fabric as set forth in claim 1 having a total weight in the order of 6.5 to 9 ozs. per square yard and a pile weight in the order of 1.0 to 3.5 ozs. per square yard.

5. An embossed flocked fabric having a substrate and pile extending therefrom with the pile having a foreground pattern and textured background pattern wherein the textured background pattern is characterized by groups of pile fibers arranged in a visually discernable pattern, each group including pile fibers extending from the substrate to a distance differing from that of pile fibers located adjacent to the group, and is formed by an acid etch engraved pattern and the foreground pattern is formed by a routing engraved pattern on a common embossing cylinder or roll.

6. A fabric as set forth in claim 5 wherein said foreground and textured background patterns are formed in a nylon pile that is flocked to said substrate.

7. A fabric as set forth in claim 5 wherein said foreground pattern has a pile depth in the order of 1.5 to 100 times that of the textured background pattern.

8. An embossed flocked fabric as set forth in claim 5 having a total weight in the order of 6.5 to 9 ozs. per square yard and a pile weight in the order of 1.0 to 3.5 ozs. per square yard.

9. An embossed pile fabric with the pile fibers embossed in an overall pattern having a background pattern and a foreground pattern, said background pattern being characterized by groups of pile fibers arranged in a visually discernable pattern, each group including pile fibers extending from the substrate to a distance differing from that of pile fibers located adjacent to the group, and being formed by an engraved portion of a cylinder defined by a process selected from the group consisting of a mill engraving technique and an acid engraving technique and said foreground pattern formed by a routing engraved portion of a cylinder or roll.

10. An embossed pile fabric having a substrate and pile extending therefrom with the fabric having a foreground pattern and background pattern, the background pattern being characterized by groups of pile fibers arranged in a visually discernable pattern, each group including pile fibers extending from the substrate to a distance differing from that of pile fibers located adjacent to the group, and the patterns being formed by an embossing cylinder in which the depth of the engraved pattern forming the foreground pattern is at least in the order of 20% greater than the height of the pile.

11. An embossed pile fabric as set forth in claim 10 wherein said fabric is a flocked fabric.

12. An embossed pile fabric having a substrate and pile extending therefrom with the fabric having a foreground pattern and a background pattern, with the background pattern comprising a textured pattern characterized by groups of pile fibers arranged in a visually discernable pattern, each group including pile fibers extending from the substrate to a distance differing from that of pile fibers located adjacent to the group, and with pile in regions comprising the foreground pattern having a pile depth that exceeds a pile depth of pile in regions comprising the background pattern.

13. The embossed pile fabric as set forth in claim 12, wherein the fabric is a flocked fabric.

14. The embossed pile fabric as set forth in claim 12, wherein the pile depth in regions comprising the foreground pattern is on the order of 1.5 to 100 times the pile depth in regions comprising the background pattern.

15. The embossed pile fabric as set forth in claim 12, wherein the background pattern is formed on the fabric by a pattern formed on an embossing cylinder by an engraving method selected from the group consisting of mill engraving and acid etching.

16. The embossed pile fabric as set forth in claim 15 wherein the foreground pattern is formed on the fabric by a pattern formed on the embossing cylinder by routing engraving.

* * * * *